May 13, 1958  M. J. FERGUSON  2,834,685
COMBINATION CONFECTION HOLDER AND TOY BOAT
Filed Sept. 15, 1954
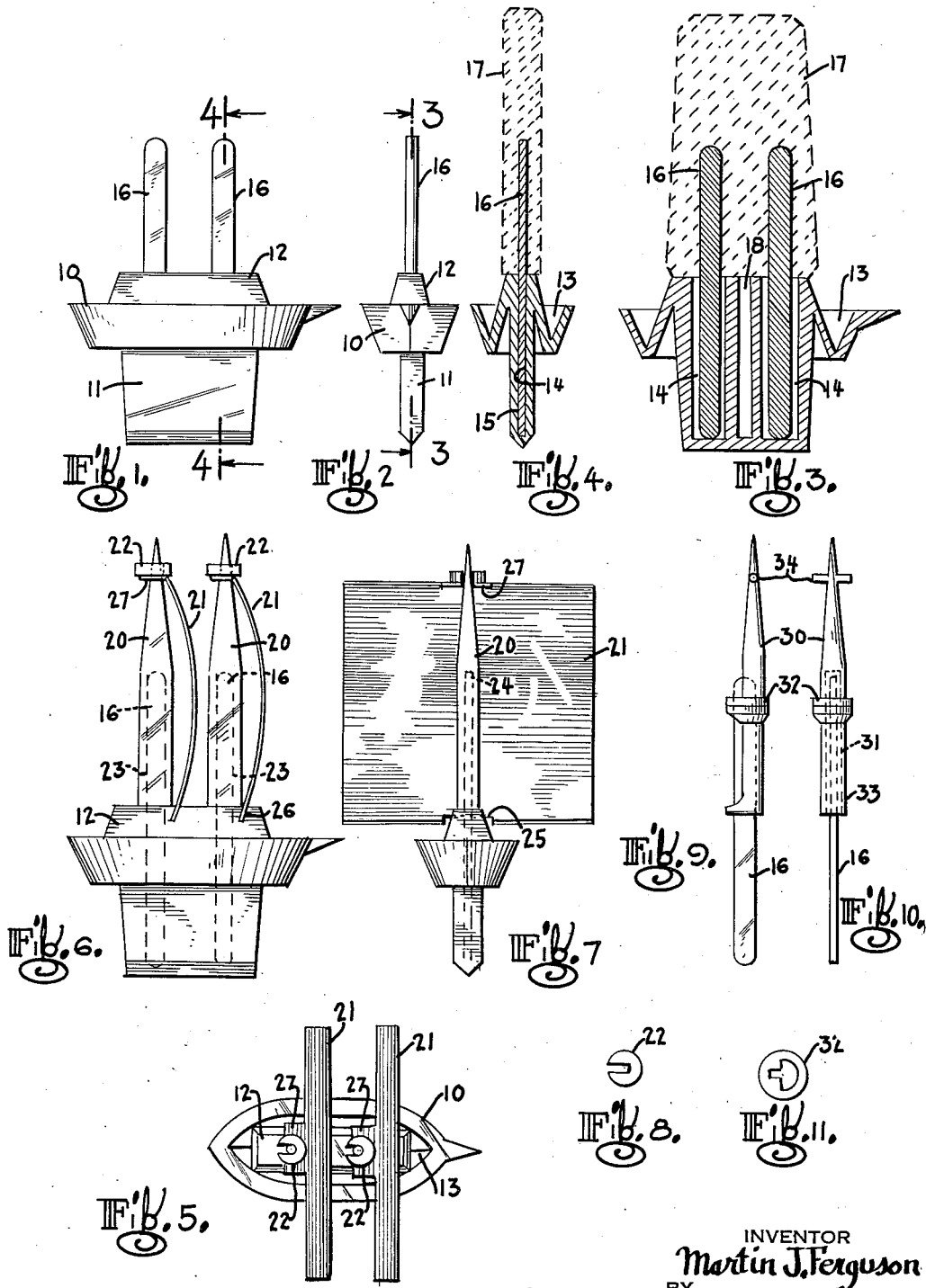
INVENTOR
Martin J. Ferguson
BY
Pollard, Johnston, Smythe & Robertson
ATTORNEYS

United States Patent Office 2,834,685
Patented May 13, 1958

2,834,685

COMBINATION CONFECTION HOLDER AND TOY BOAT

Martin J. Ferguson, Rye, N. Y.

Application September 15, 1954, Serial No. 456,203

8 Claims. (Cl. 99—137)

This invention relates to a combination holder for ice cream or ice on a stick and toy preferably fabricated from a light weight molded plastic.

One of the disadvantages in the consumption of ice and ice cream confections frozen on a stick is the tendency of the confection especially in hot weather (when the number consumed is highest) to melt somewhat and drip before it can be completely consumed. The napkin sometimes provided by the seller of the confection can absorb a small amount of liquefied material, but when an appreciable amount of liquid forms, it runs off and produces a mess which may cause serious damage to clothing or to rugs, upholstery or other furnishings of the home or automobile.

The object of the invention is to provide a holder and handle for the ice and ice cream confections of the frozen-on-a-stick variety for use when the confection is being consumed so constructed as to serve the function of collecting any of the confection which may melt before it can be consumed.

Since confections of this type sell at a low price, an anti-drip holder to serve only this function could not for economic reasons be given away with each purchase. Accordingly another object is to provide a device serving a dual function, first as a confection holder and then as a toy boat, making use of the stick or sticks as a mast or mast support.

The device of the invention may be considered to involve an open top, boat-shaped container the inside of which serves to collect melted confection, a keel serving as a handle having one or two slots therein leading from inside or the top of the container adapted to receive the handle end of the stick or sticks of the confection and a support or platform in the center of the container preferably extending up from the bottom thereof, the top of which is suitably as high as or slightly above the level of the gunwales or sides of the boat-container. This support or platform serves the function of supporting the confection at a level above the base of the container to provide ready access of the bottom portion of the confection during its consumption. The slots in the keel may be straight sided or they may converge slightly to provide a grip to hold the stick securely therein.

In its simplest embodiment, the exposed end of the stick (or sticks) remaining after the consumption of the confection serves as the mast. In the preferred embodiment, the stick serves only as a joining means for a separate mast of a greater length than the exposed end of the stick which can be slipped over or on to the stick. When the separate mast is to be used, the platform should be at a higher level than the sides of the container and notched to provide base support for sails.

The invention in its several embodiments can be readily understood from the accompanying drawing wherein:

Figures 1 to 4 illustrate the first embodiment of the invention, Figure 1 being a side elevation, Figure 2 an end elevation, Figure 3 a vertical section on line 3—3 of Figure 2 and Figure 4 a vertical section on line 4—4 of Figure 1. Figures 5 to 8 illustrate a second embodiment which includes molded masts and preferably also sails, Figure 5 being a top plan view, Figure 6 a side elevation and Figure 7 an end elevation, and Figure 8 being a plan view of a disk clip for holding the sails to the top of the masts.

Figure 9 to 11 illustrate an alternative embodiment of the mast, Figure 9 being a side elevation, Figure 10 an end elevation and Figure 11 a plan view of a holding disk for attaching the mast to the stick.

With further reference to Figures 1 to 4, there is illustrated a boat body or boat-shaped container 10 having a keel and handle 11 and a platform 12 rising from the center of the bottom of the container to a level somewhat above the level of the gunwales or sides leaving a trough 13 surrounding the platform. The platform and keel are penetrated by slots 14 of a size adapted to receive the wooden sticks of conventional ice cream confections. These slots are tapered inwardly as shown at 15 in Figure 4 such that when the sticks are forced into the slots, the sticks are gripped and are held firmly. In Figures 1 and 2 the sticks 16 are in place in the container and serve as masts when the container is being used as a toy boat. In Figures 3 and 4 the sticks 16 are shown serving their initial function of supporting the ice or ice cream 17 on the container 10. As shown in Figure 3, the container-boat 10 is provided with a well 18 for insertion of ballast extending from the center of the platform down into the bottom of the keel 11.

With reference to Figures 5 and 6 there is illustrated an embodiment of the invention which includes masts 20, sails 21 and disk clips 22. The mast 20 are provided with slots 23 opening into the bottom ends thereof adapted to slip over and engage the sticks 16. These slots taper such that they are narrower at the top end 24 such that the sticks are gripped when the masts 20 are put in place.

The sails 21 which may be constructed of a semi-rigid plastic of the general properties of Celluloid, as acetate sheeting and resin-impregnated paper, contain a cut-out section 25 in the bottom center thereof adapted to fit into the notch 26 in the platform 12. The sails 21 are attached to the top of the mast by means of a perforated tab 27 which slips down over the pointed top of the masts 20. The disk clips 22 slip over the pointed tops of the mast and frictionally engage the same so as to hold the tabs 27 of the sails 21.

The alternative embodiment of the invention illustrated in Figures 9 to 11 involves a mast 30 containing an open sided slot 31 adapted to receive the stick 16. The mast is attached to the stick by means of the holding disk 32 which slips down over the top of the mast and over the top of the stick. The slot 31 in the mast 30 is constricted sufficiently at 33 to grip the stick 16. In this embodiment the mast 30 is provided with a pin 34 which can serve the function of holding the top of the sail in which case the tab would be provided with a slot (not shown) adapted to fit over and under the pin 34.

From the foregoing description it will be observed that the container boat will serve its initial function of holding an ice or ice cream confection during the consumption thereof. The keel of the boat serves as the handle and as the confection melts the melted material will flow down into the trough or bottom of the boat. With this device the confection can be consumed without fear of damage to automobile or household upholstery or rugs or to clothing. After consumption of the confection the container constitutes a toy boat with the confection sticks as the masts. The boat can be made more attractive by the attachment of the higher masts and sails illustrated in the second embodiment of the invention.

The sticks remaining from the confection, in this instance, serve as a means of securing the masts to the boat, the attachment being effected preferably by friction but by any other method if so desired. The sailing performance of the boat may be altered or improved by the introduction of air rifle shot or other heavy material into the slot 18 extending into the keel. The sails and boats may be variously colored and illustrated to represent sailing ships of historical interest.

It should be understood that the invention is not limited to the specific elements or other details herein shown but that it extends to all equivalents which will occur to those skilled in the art upon consideration of the description of the invention encompassed in the claims appended hereto.

I claim:

1. A combination toy boat and frozen-on-a-stick confection holder comprising a boat-shaped supporting container for the confection including a unitary hull and keel, said keel serving as a handle when the confection is being consumed, a platform in the center section of the boat at a level at least as high as the gunwales of said boat, a slot extending downwardly through said platform into said keel adapted to receive the handle end of a confection-on-a-stick, the boat thereby comprising a holder for said confection during consumption thereof.

2. The structure of claim 1 including a confection stick having its bottom portion in said slot, and a mast for said boat of a greater length than the remaining top portion of said stick having a slot opening into the lower end thereof adapted to slip over and engage the upper free end of said stick.

3. The structure of claim 2 including a semi-rigid sail supported by said boat and attached to said mast at its upper end.

4. The structure of claim 3 wherein the sail fits in a slot in the platform and is attached to the mast by means of a tab having a perforation adapted to slip over the end of the mast.

5. The structure of claim 4 wherein the slot in the mast is open on one side thereof and the mast held to the stick by means of a perforated disk slipped over the top of the mast and thence over top of the stick.

6. A combination toy boat and frozen-on-a-stick confection holder comprising a boat-shaped supporting container for the confection including a unitary hull and keel, said keel serving as a handle when the confection is being consumed, an elevated central section rising from the bottom of said boat on which the confection will rest during its consumption, said elevated section with the hull serving to form a groove around said section for collecting any liquid flowing from the frozen confection and a slot extending through said section into said keel adapted to receive the stick of said confection, said stick serving as a mast after the confection is consumed.

7. A combination toy boat and frozen-on-a-stick confection holder comprising a boat-shaped supporting container for the confection including a unitary hull and keel, said keel serving as a handle when the confection is being consumed, an elevated central section rising from the bottom of said boat on which the confection will rest during its consumption, said elevated section with the hull serving to form a groove around said section for collecting any liquid flowing from the frozen confection, a slot extending through said section into said keel adapted to receive the stick means of said confection, and a mast having a slot in the base portion thereof adapted to receive the exposed part of the stick above the said elevated central section.

8. The apparatus of claim 7 in which the slot in the mast is open along one side and is held in place on the stick by means of a disk slipped over the mast and stick.

References Cited in the file of this patent

UNITED STATES PATENTS

| | | |
|---|---|---|
| D. 118,840 | Texter et al. | Feb. 6, 1940 |
| 1,616,948 | Boucher | Feb. 8, 1927 |
| 1,936,816 | Zitzman | Nov. 28, 1933 |
| 1,990,198 | Murphy | Feb. 5, 1935 |
| 2,233,460 | Pizzarelli | Mar. 4, 1941 |